(12) United States Patent
Huang et al.

(10) Patent No.: US 8,848,402 B2
(45) Date of Patent: Sep. 30, 2014

(54) POWER FACTOR CORRECTION APPARATUS

(75) Inventors: Wen-Nan Huang, New Taipei (TW);
Yao-Wen Tsai, New Taipei (TW);
Shiu-Hui Lee, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 176 days.

(21) Appl. No.: 13/480,957

(22) Filed: May 25, 2012

(65) Prior Publication Data
US 2013/0314056 A1  Nov. 28, 2013

(51) Int. Cl.
*H02J 1/02* (2006.01)

(52) U.S. Cl.
USPC ............................... 363/39; 363/41

(58) Field of Classification Search
USPC ........... 363/41, 44, 21.01, 21.05, 82, 89, 126, 363/127; 323/222, 224, 226, 282–288; 315/201, 224, 247, 291, 307, 294
See application file for complete search history.

(56) References Cited

U.S. PATENT DOCUMENTS

| | | | |
|---|---|---|---|
| 6,469,917 B1 * | 10/2002 | Ben-Yaakov | 363/44 |
| 6,584,478 B1 * | 6/2003 | Spertus | 1/1 |
| 6,756,771 B1 * | 6/2004 | Ball et al. | 323/222 |
| 7,292,005 B2 * | 11/2007 | Pietkiewicz et al. | 320/166 |
| 7,863,828 B2 * | 1/2011 | Melanson | 315/247 |
| 7,956,549 B2 * | 6/2011 | Chung et al. | 315/248 |
| 8,059,432 B2 * | 11/2011 | Kraft | 363/56.11 |

* cited by examiner

*Primary Examiner* — Rajnikant Patel
(74) *Attorney, Agent, or Firm* — Muncy, Geissler, Olds & Lowe, P.C.

(57) ABSTRACT

A power factor correction apparatus is applied to an alternating-current voltage apparatus and a rear end circuit. The power factor correction apparatus includes a power factor correction unit, a control unit, and a ripple detecting unit. The power factor correction unit is electrically connected to the rear end circuit and the alternating-current voltage apparatus. The control unit is electrically connected to the power factor correction unit. The ripple detecting unit is electrically connected to the rear end circuit, the power factor correction unit, and the control unit. The control unit is informed by the ripple detecting unit to control the power factor correction unit to adjust the power factor after the ripple of the signal outputted from the power factor correction unit is detected by the ripple detecting unit.

6 Claims, 1 Drawing Sheet

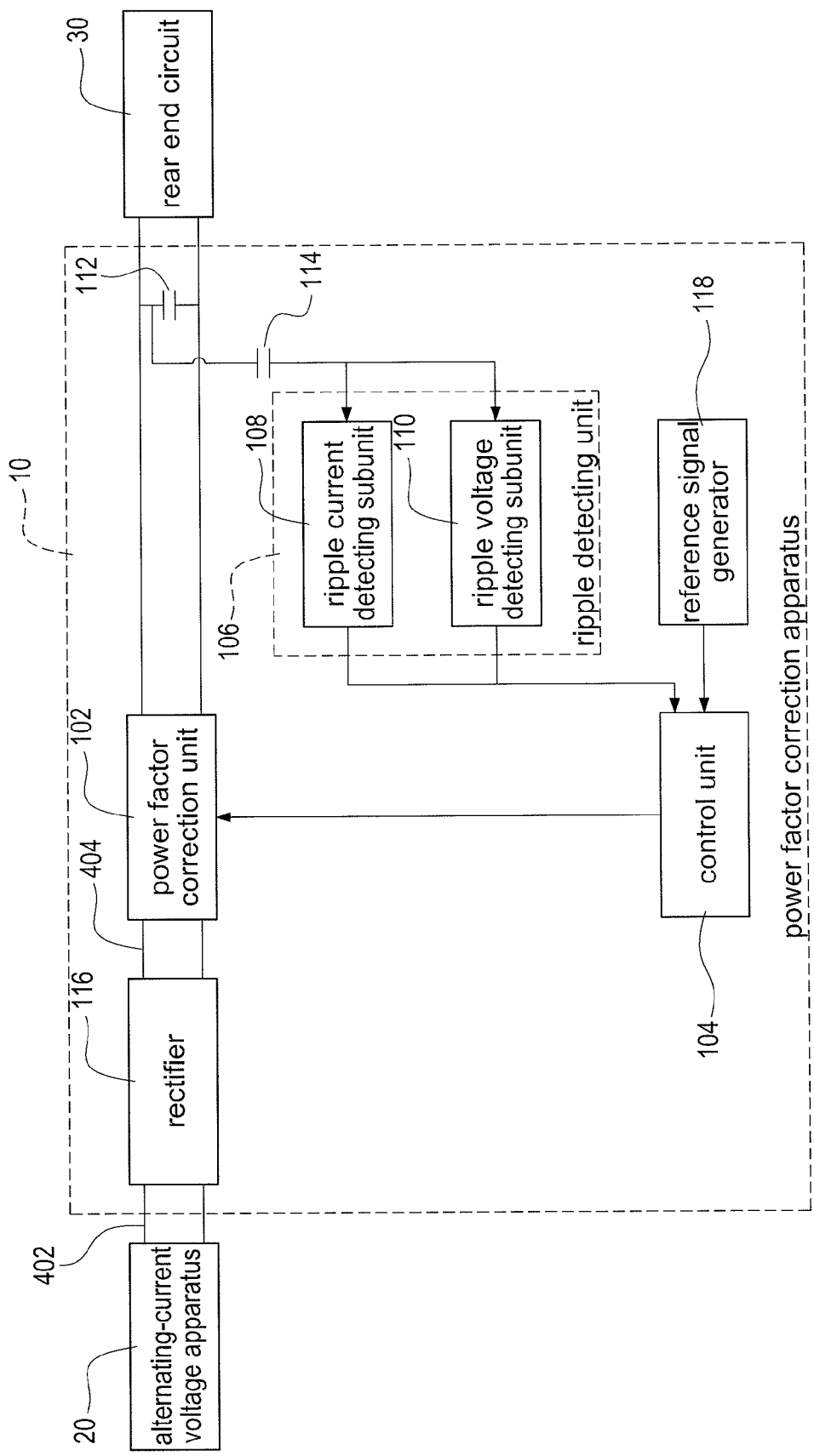

POWER FACTOR CORRECTION APPARATUS

BACKGROUND OF THE INVENTION

1. Field of the Invention

The present invention relates to a correction apparatus, and especially relates to a power factor correction apparatus.

2. Description of Prior Art

The power factor of an alternating-current power system is defined as the ratio of the real power flowing to the load over the apparent power in the circuit, and is a number between 0 and 1. The power factor is very important. The power factor could be improved by a power factor correction circuit. Therefore, the power factor correction circuit is very common in power circuits. Generally speaking, the phase of the current will be designed to close to the phase of the voltage, so that the power factor will be higher.

Most of the prior art power factor correction circuits are complicated, so that the cost of the prior art power factor correction circuit is high. Therefore, it is very important to research a power factor correction circuit with simpler design and lower cost.

SUMMARY OF THE INVENTION

In order to solve the above-mentioned problems, an object of the present invention is to provide a power factor correction apparatus.

In order to achieve the object of the present invention mentioned above, the power factor correction apparatus of the present invention is applied to an alternating-current voltage apparatus and a rear end circuit. The power factor correction apparatus includes a power factor correction unit, a control unit, and a ripple detecting unit. The power factor correction unit is electrically connected to the rear end circuit and the alternating-current voltage apparatus. The control unit is electrically connected to the power factor correction unit. The ripple detecting unit is electrically connected to the rear end circuit, the power factor correction unit, and the control unit. The control unit is informed by the ripple detecting unit to control the power factor correction unit to adjust the power factor after the ripple of the signal outputted from the power factor correction unit is detected by the ripple detecting unit.

The efficiency of the present invention is to provide a power factor correction circuit with simpler design and lower cost.

BRIEF DESCRIPTION OF DRAWING

FIG. 1 shows a block diagram of the power factor correction apparatus of the present invention.

DETAILED DESCRIPTION OF THE INVENTION

FIG. 1 shows a block diagram of the power factor correction apparatus of the present invention. The power factor correction apparatus 10 of the present invention is applied to an alternating-current voltage apparatus 20 and a rear end circuit 30.

The power factor correction apparatus 10 includes a power factor correction unit 102, a control unit 104, a ripple detecting unit 106, a first direct current isolation unit 112, a second direct current isolation unit 114, a rectifier 116, and a reference signal generator 118.

The ripple detecting unit 106 includes a ripple current detecting subunit 108 and a ripple voltage detecting subunit 110.

The power factor correction unit 102 is electrically connected to the rear end circuit 30 and the alternating-current voltage apparatus 20. The control unit 104 is electrically connected to the power factor correction unit 102. The ripple detecting unit 106 is electrically connected to the rear end circuit 30, the power factor correction unit 102, and the control unit 104.

The first direct current isolation unit 112 is electrically connected to the rear end circuit 30, the power factor correction unit 102, the ripple current detecting subunit 108, and the ripple voltage detecting subunit 110. The second direct current isolation unit 114 is electrically connected to the rear end circuit 30, the power factor correction unit 102, the ripple current detecting subunit 108, the ripple voltage detecting subunit 110, and the first direct current isolation unit 112.

The rectifier 116 is electrically connected to the power factor correction unit 102 and the alternating-current voltage apparatus 20. The reference signal generator 118 is electrically connected to the control unit 104.

The ripple current detecting subunit 108 is electrically connected to the rear end circuit 30, the power factor correction unit 102, and the control unit 104. The ripple voltage detecting subunit 110 is electrically connected to the rear end circuit 30, the power factor correction unit 102, the control unit 104, and the ripple current detecting subunit 108.

An alternating-current voltage 402 is sent from the alternating-current voltage apparatus 20 to the rectifier 116. The alternating-current voltage 402 is rectified to form a rectified voltage 404 by the rectifier 116. The rectified voltage 404 is sent from the rectifier 116 to the power factor correction unit 102.

The ripple detecting unit 106 detects the ripple in the output signal of the power factor correction unit 102. Afterward, the control unit 104 is informed by the ripple detecting unit 106 to control the power factor correction unit 102, thus adjusting the power factor of the power factor correction apparatus 10. The ripple of the signal outputted from the power factor correction unit 102 could be the ripple of the current, or the ripple of the voltage, or the ripple of the current and the voltage.

The power factor correction unit 102 is, for example, an active power factor correction circuit. The rectifier 116 is, for example, a bridge rectifier. The first direct current isolation unit 112 is, for example, a capacitor. The second direct current isolation unit 114 is, for example, a capacitor.

The equations for output ripple voltage, output ripple current, and input side voltage are as following: Assume the input voltage is an ideal sine wave, and the power factor is 1. The symbol yin represents the maximum of the input voltage. The symbol Vin represents the effective value of the input voltage. The symbol iin represents the maximum of the input current. The symbol Iin represents the effective value of the input current. The symbol fL represents the frequency. The symbol Po represents the output power. The symbol Pin represents the input power. The symbol io represents the output current. The symbol Vo represents the output voltage. The symbol Iripple represents the output ripple current. The symbol Vripple represents the output ripple voltage. The symbol Co represents the capacitor value of the first direct current isolation unit 112.

$$vin = \sqrt{2} Vin \cdot |sin WLt|$$

$$iin = \sqrt{2} Iin \cdot |sin WLt|$$

$$WL = 2\cdot\pi\cdot fL$$

$$Po = Pin = Vin\cdot Vin\cdot Iin\cdot(1-\cos 2WLt)$$

$$io = Po/Vo = [Vin\cdot Iin\cdot(1-\cos 2WLt)]/Vo$$

After the part of the direct current is filtered:

$$Iripple = (Vin\cdot Iin\cdot\cos 2WLt)/Vo$$

The output ripple voltage is derived after integral computing:

$$Vripple = [Vin\cdot Iin\cdot\sin(2WLt+\pi)]/2\cdot Vo\cdot WL\cdot Co$$

The efficiency of the present invention is to provide a power factor correction circuit with simpler design and lower cost.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power factor correction apparatus applied to an alternating-current voltage apparatus and a rear end circuit, the power factor correction apparatus including:
    a power factor correction unit electrically connected to the rear end circuit and the alternating-current voltage apparatus;
    a control unit electrically connected to the power factor correction unit; and
    a ripple detecting unit electrically connected to the rear end circuit, the power factor correction unit, and the control unit,
    wherein the ripple detecting unit is configured to detect ripple of the signal outputted from the power factor correction unit;
    wherein the control unit is configured to control the power factor correction unit to adjust a power factor of the power factor correction apparatus after the control unit is informed by the ripple detecting unit;
    wherein the ripple detecting unit includes:
    a ripple current detecting subunit electrically connected to the rear end circuit, the power factor correction unit, and the control unit; and
    a ripple voltage detecting subunit electrically connected to the rear end circuit, the power factor correction unit, the control unit, and the ripple current detecting subunit;
    wherein the ripple of the signal outputted from the power factor correction unit is the ripple of the current, or the ripple of the voltage, or the ripple of the current and the voltage;
    the power factor correction apparatus further comprising:
    a first direct current isolation unit electrically connected to the rear end circuit, the power factor correction unit, the ripple current detecting subunit, and the ripple voltage detecting subunit; and
    a second direct current isolation unit electrically connected to the rear end circuit, the power factor correction unit, the ripple current detecting subunit, the ripple voltage detecting subunit, and the first direct current isolation unit;
    wherein the equations for output ripple voltage, output ripple current, and input side voltage are as following: the input voltage is an ideal sine wave, and the power factor is 1; the symbol vin represents the maximum of the input voltage; the symbol Vin represents the effective value of the input voltage; the symbol iin represents the maximum of the input current; the symbol Iin represents the effective value of the input current; the symbol fL represents the frequency; the symbol Po represents the output power; the symbol Pin represents the input power; the symbol io represents the output current; the symbol Vo represents the output voltage; the symbol Iripple represents the output ripple current; the symbol Vripple represents the output ripple voltage; the symbol Co represents the capacitor value of the first direct current isolation unit;

$$vin = \sqrt{2}\cdot Vin\cdot|\sin WLt|$$

$$iin = \sqrt{2}\cdot Iin\cdot|\sin WLt|$$

$$WL = 2\cdot\pi\cdot fL$$

$$Po = Pin = vin\cdot iin = Vin\cdot Iin\cdot(1-\cos 2WLt)$$

$$io = Po/Vo = [Vin\cdot Iin\cdot(1-\cos 2WLt)]/Vo$$

after the part of the direct current is filtered:

$$Iripple = (Vin\cdot Iin\cdot\cos 2WLt)/Vo$$

the output ripple voltage is derived after integral computing:

$$Vripple = [Vin\cdot Iin\cdot\sin(2WLt+\pi)]/2\cdot Vo\cdot WL\cdot Co.$$

2. The power factor correction apparatus in claim 1, further including:
    a rectifier electrically connected to the power factor correction unit and the alternating-current voltage apparatus,
    wherein an alternating-current voltage is sent from the alternating-current voltage apparatus to the rectifier; the alternating-current voltage is rectified to form a rectified voltage by the rectifier; the rectified voltage is sent from the rectifier to the power factor correction unit.

3. The power factor correction apparatus in claim 2, further including:
    a reference signal generator electrically connected to the control unit.

4. The power factor correction apparatus in claim 3, wherein the power factor correction unit is an active power factor correction circuit.

5. The power factor correction apparatus in claim 4, wherein the rectifier is a bridge rectifier.

6. The power factor correction apparatus in claim 5, wherein the first direct current isolation unit is a capacitor; the second direct current isolation unit is a capacitor.

* * * * *